Figure 8:
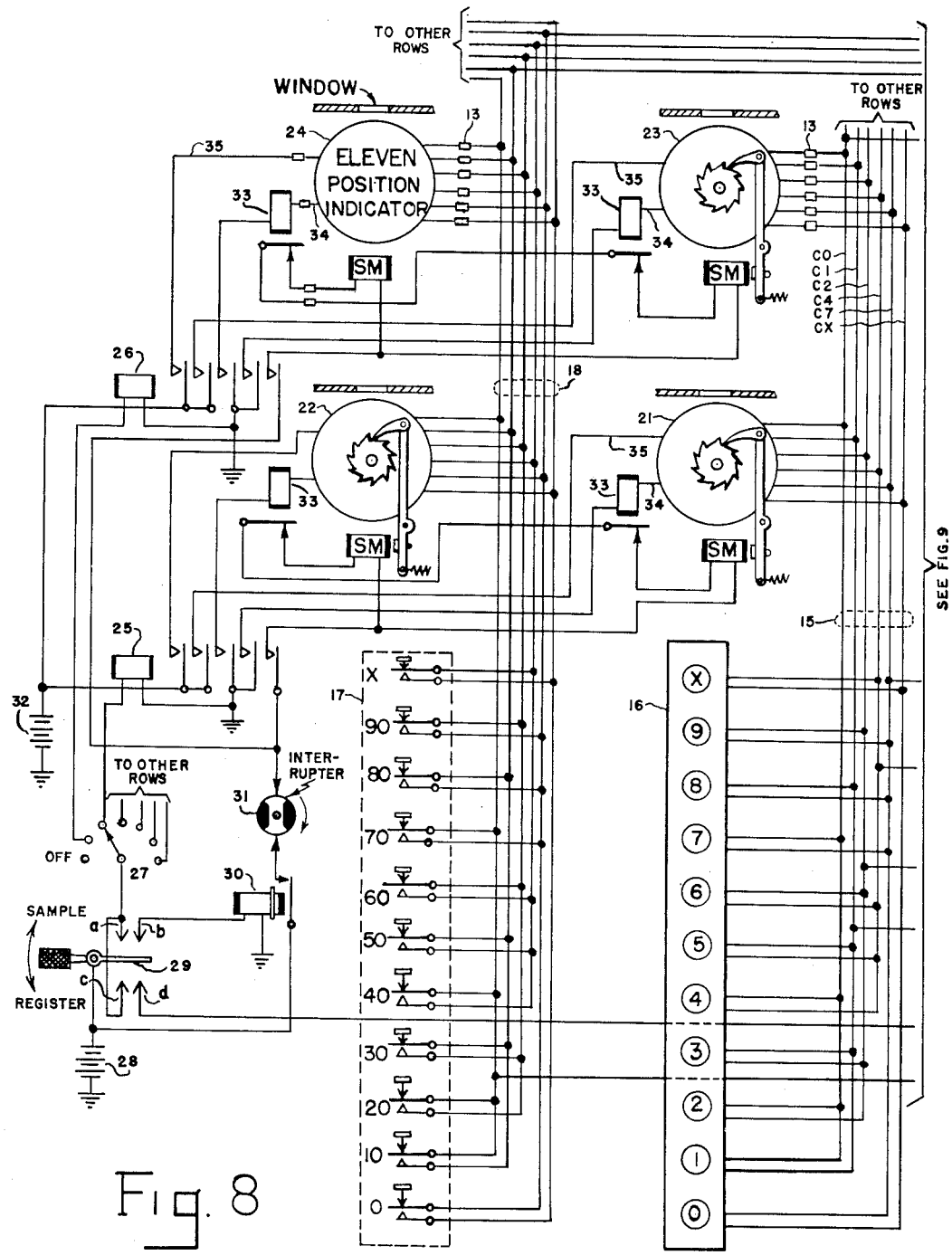

June 26, 1956     G. L. BUSH ET AL     2,752,093
INDICATOR DEVICE AND ANALOGUE COMPUTER CIRCUIT
Filed July 18, 1952     3 Sheets-Sheet 1
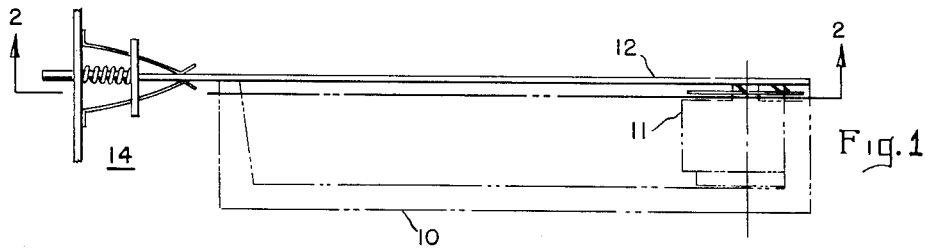
Fig. 1
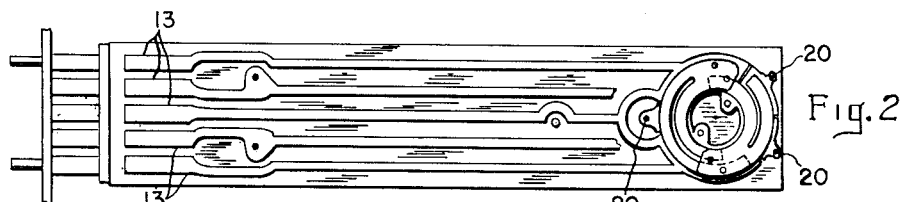
Fig. 2
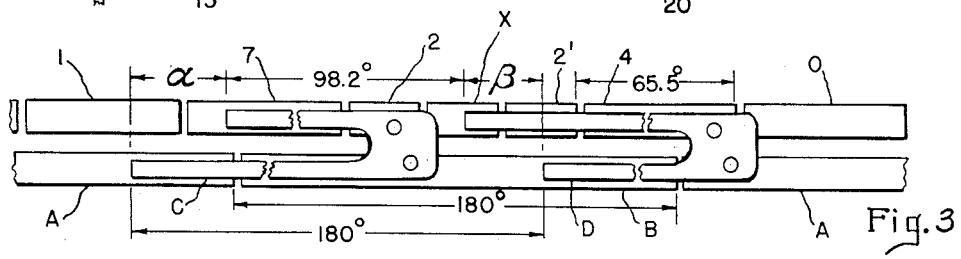
Fig. 3
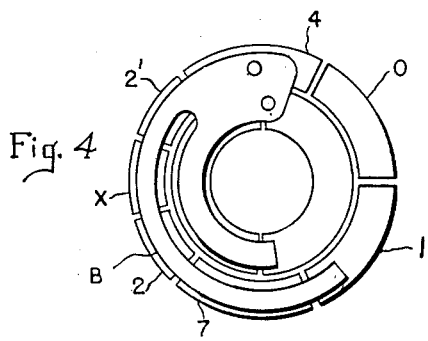
Fig. 4
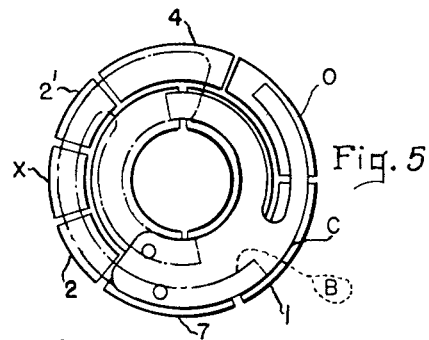
Fig. 5
| DISPLAY | SEGMENTS BRIDGED | | | |
|---|---|---|---|---|
| | BY BRUSH C | | BY BRUSH D | |
| 1 | 0 | B | 1 | A |
| 7 | 0 | A | 7 | B |
| 8 | 1 | A | 7 | B |
| 3 | 1 | A | 2 | B |
| 0 | 7 | A | X | B |
| 9 | 7 | A | 2 | B |
| 6 | 2 | B | 4 | A |
| BLANK | X | B | 4 | A |
| 2 | 2 | B | 0 | A |
| 4 | 4 | B | 0 | A |
| 5 | 4 | B | 1 | A |
Fig. 7
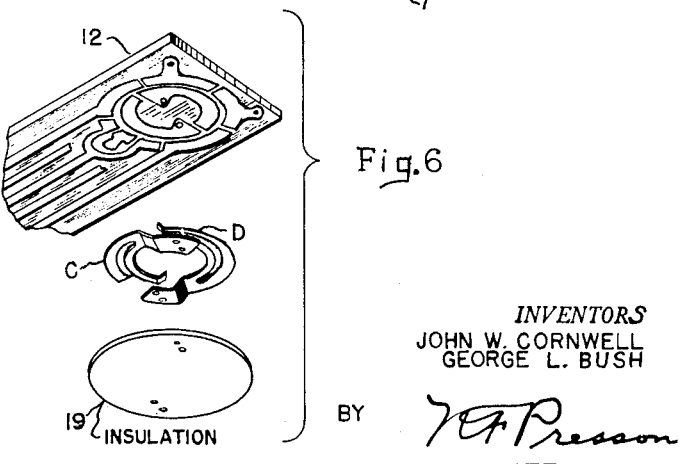
Fig. 6
*INVENTORS*
JOHN W. CORNWELL
GEORGE L. BUSH
BY    *T. F. Presson*
ATTORNEY

INVENTORS
JOHN W. CORNWELL
GEORGE L. BUSH

BY *J.F. Presson*

ATTORNEY

United States Patent Office 2,752,093
Patented June 26, 1956

2,752,093

INDICATOR DEVICE AND ANALOGUE COMPUTER CIRCUIT

George L. Bush, Flushing, and John W. Cornwell, Syosset, N. Y., assignors to The Teleregister Corporation, New York, N. Y., a corporation of Delaware Application July 18, 1952, Serial No. 299,706

17 Claims. (Cl. 235—61)

This invention relates to indicator units and an associated circuit arrangement for obtaining analogue values. The indicator unit is adapted for remote control in response to safety code signals. The associated circuit is capable of use for deriving analogue values corresponding to the sum of the numerical displays of a plurality of indicators.

Revolving drum-type indicators are extensively used in stock quotation boards and systems of that general character. Our indicator units are of this same type. Our improvements relate generally to a segmented commutator over which two bridging brushes are enabled to wipe as the indicator drum is rotated. Our improvements are also incorporated into a circuit arrangement whereby it becomes possible to obtain direct readings of the indicator settings at a remote point and to convert such readings into analogue values such as may be useful in various forms of computation work or for making comparisons.

Among the objects of our invention the following are considered to be of prime importance:

1. To provide an indicator unit which is settable to a new position in response to code signals, as distinguished from counting pulses, and which does not require preliminary re-set pulses for restoring the drum to a blank, or zero position before responding to the significant setting signals.

2. To provide a segmented commutator and brush arrangement for our improved indicator units which facilitates instant conversion of the numerical values of the indicator settings into analogue values, whereby a number of such values may be integrated.

3. To provide a circuit arrangement for use in posting statistical data on selected indicator units, and for obtaining a read-out from any desired indicator, such read-out being characterized as safety-code signals having the proper significance for direct conversion into analogue values.

4. To provide an eleven-position indicator and a segmented commutator therefor, the design being such that a 6-element safety code may be used for setting and for read-out purposes.

5. To provide the means for simplifying and otherwise improving the structural features of the components used in a system of the type herein described. Among these structural improvements we mention particularly the adoption of an etched or printed circuit which comprises the commutator itself and a set of terminals mounted on an insulation plate and adapted for insertion into a connector jack.

The invention will now be described in more detail, reference being made to the accompanying drawings wherein—

Figure 1 is a side elevation view of an indicator unit having a printed circuit commutator and associated brushes for carrying out the objects of the invention.

Figures 9, 10:
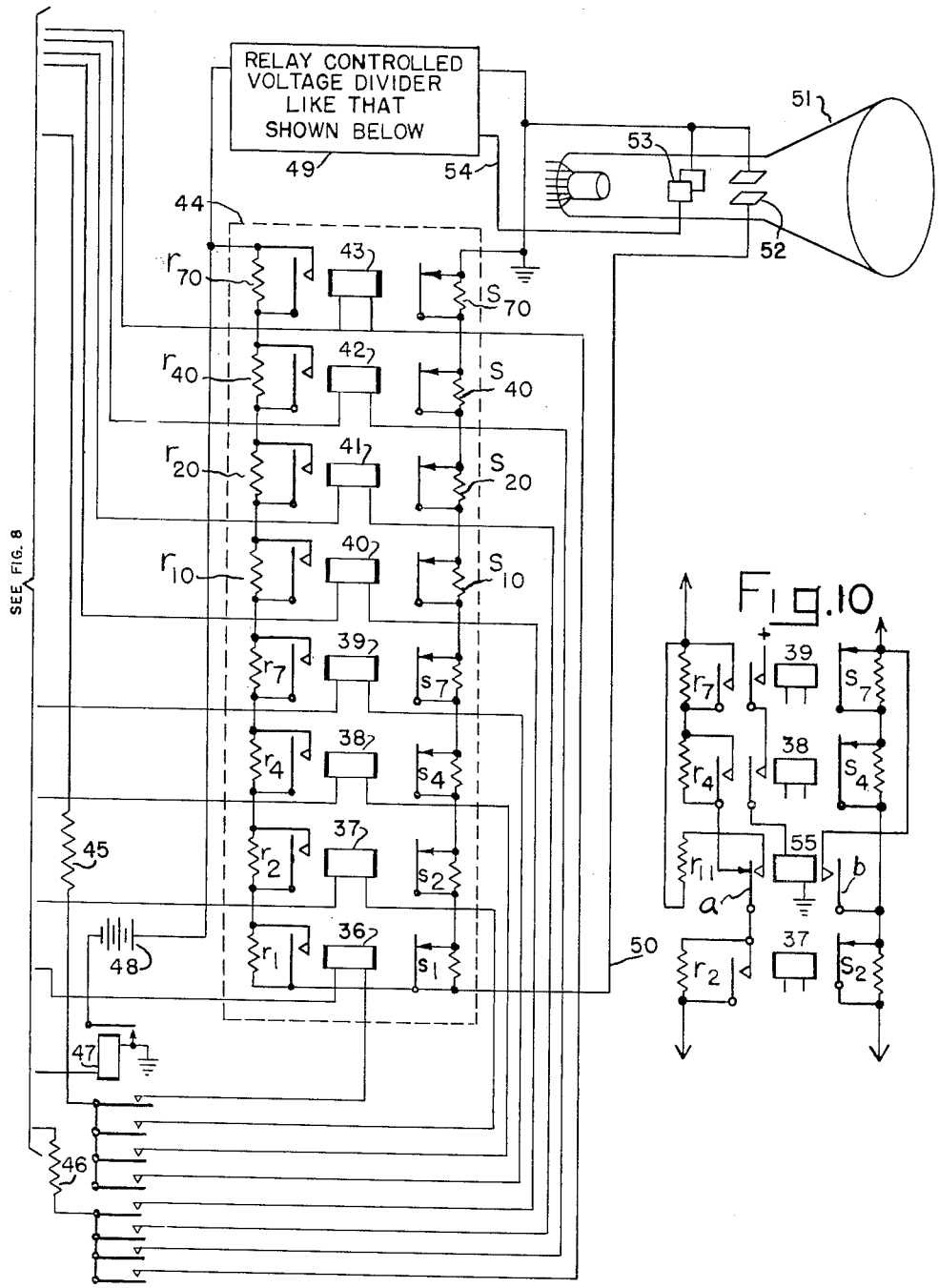

Fig. 2 is a bottom view of the printed circuit and associated brushes, this view being the same as a section taken along the line 2—2 of Fig. 1, Fig. 3 is a development diagram of the segmented portion of the printed circuit, showing also certain arcuate points of relative contact of the brushes as they rest on segments of the commutator, Figs. 4 and 5 are showings of each of the two brushes in their assembled relations to the commutator, Fig. 6 is an exploded perspective view of the commutator and brush assembly, Fig. 7 is a table showing certain relationships between brush positions and indicator displays which we have found to be compatible with the use of an additive safety code and to obtain analogue values of output signals corresponding to the settings of the indicator, Figs. 8 and 9, viewed collectively, constitute a circuit digram which is referred to in explaining the operation of the system, and, Fig. 10 is a fragmentary circuit diagram showing how Fig. 9 can be modified for use of a 5-element code.

Our system is designed to take advantage of the favorable features of a safety code for signaling requirements. This is a code wherein each permutation has a uniform number of marking elements and a uniform number of spacing elements. The advantages of using this code or its equivalent are that mutilation of the code, if caused, for example by a static pulse in radio transmission, will automatically show itself to be erroneous, and will avoid the completion of erroneous indicator settings or read-outs.

Referring generally to Figs. 1 to 6 inclusive, the indicator unit 10, and portions thereof, are outlined sufficiently to explain the nature of our invention, but non-essential details are omitted for the sake of clarity of the disclosure. The revolving indicator drum 11 is provided with an electromechanical setting mechanism of the ratchet and pawl type, such as that diagrammatically shown in Fig. 8. The stepping mechanism includes a ratchet and pawl arrangement which is pulse-actuated in opposition to a spring-driven retractive stroke of the pawl. Rotation of the indicator drum occurs upon cessation of each pulse.

Ten or eleven characters are delineated on the periphery of the drum dial 11. These characters appear singly through a window at the right hand end of the indicator unit, as viewed in Fig. 1. With ten successive steps taken by the indicator drum its numerals or other display characters will appear in the following order, "1," "7," "8," "3," "0," "9," "6," "blank," "2," "4," "5." In the blank position (so-called) any desired character may be displayed if desired. The "0" and "blank" positions may be interchanged if desired.

In order to move the indicator drum from any given setting to any new setting not more than ten steps are required. The new setting is determined by stepping the drum along until a position is reached where the two brushes mounted on the top of the indicator drum are caused to rest upon two live segments of the commutator. On reaching this position a relay 33 having circuit opening contacts in the stepping circuit is operated. This operation terminates the step-by-step movement of the indicator drum. The setting operation will be hereinafter explained in more detail and with reference to the circuit diagram of Figs. 8 and 9.

The printed circuit

Our novel printed circuit (so-called) may be fabricated in any well known manner, either by printing upon a flat plate of insulation material with conductive ink, or by causing flat conductive sheets to be affixed to the two sides of the base plate and then chemically etched to remove unwanted portions of the metal, leaving wanted portions as commutator segments and individual conductors. Our printed circuit as shown comprises a commutator portion having outer and inner rings and conductors extending to the rear of the indicator unit (the left end as shown) where they are constituted as ten separate terminals 13 to be inserted as a multiple conductor plug into an appropriately designed jack 14. There are five terminals 13 on each side of the plate 12, six of them leading to individual segments in the outer ring of the commutator, two terminals leading to the two halves of the inner ring, and two terminals connected through the winding of the stepping magnet SM (Fig. 8). The resilient leaf springs of the jack 14 make a wiping contact with the terminals of the printed circuit as the latter is injected into the jack. The jack structure is, however, not directly involved in the instant disclosure, but, if novel, is claimable in a separate application to be assigned to the assignee of the instant application. The under-side of the printed circuit, as shown in Fig. 2, has its central terminal 13 connected to two short commutator segments 2 and 2' in the outer ring. On the under-side, also are two outer terminals 13 which are connected respectively to outer ring segments 4 and 7. The two remaining terminals 13 on the underside of the printed circuit are connected by conductor (not shown) to the winding of the stepping magnet SM. On the upper side of the printed circuit two of the terminals 13 are connected respectively to the halves of the inner ring. The remaining terminals 13 on the upper side of the printed circuit are connected respectively to the long outer-ring segments 1 and 0, and the short segment X. Conductive rivets 20 are preferably used to interconnect each of these segments with its appropriate terminal-conductor on the upper side of the printed circuit.

The safety signal code

We have adopted a special signaling code for use in carrying out our invention. It serves at times for setting any selected indicator unit to display a desired one of eleven different characters, or ten characters plus a blank. The code has six elements, two of which are always "marking" while four are "spacing" elements. By assigning certain values to each element we are able to derive numerical sums of any two code elements which will correspond with the numerical display given by any particular setting of an indicator. A second use for the code results, therefore, from assigning certain values to five of its code elements and a "blank" significance to the sixth code element. In the cable 15 (Fig. 8) we show six conductors 0, 1, 2, 4, 7 and X which are referenced according to their additive significance. Each of the ten numerals in the decimal system may be designated, therefore, by a different pair of code elements, using only the first five. The sixth code element X when paired with element 4 is used to set the indicator to its blank position. When paired with the element 7 of a setting of the indicator to the "0"-position is obtained. The code element X when present in a read-out signal has no significance and cannot disturb the analogue values otherwise obtained in read-out operations.

The signal source

The setting of our novel indicator units to display different numerals or the "blank" may be accomplished with the aid of a simple keyset having key-strips for each denominational order of digits, or by use of a signal transmitter of any well known type, assuming that means are to be provided for appropriately distributing the six code elements to the six conductors in cable 15. The showing of key strips 16 for the units-denomination and 17 for the tens-denomination, and the key contacts for permutationally bridging different pairs of conductors in cables 15 and 18 is to be understood as one of many alternative devices for transmitting control signals whereby the setting of indicators may be accomplished. In this showing we need only to provide a pair of contacts to be closed by each key in order to make a selection of the position to which a desired indicator is to be set.

The commutator and brush arrangement

Figs. 2 to 6 inclusive are referred to for showing different aspects of the commutator and brush arrangement. The commutator segments preferably face downwardly and the brushes are pressed upwardly against them. This arrangement minimizes the collection of dust on the segments. The brushes C and D are both affixed to an insulation disk 19, which is mounted on the top of the indicator drum 11 and turns with it.

The ratchet-and-pawl mechanism, which is a conventional part of the setting mechanism, is driven by the setting magnet SM. The ratchet wheel teeth and the characters on the periphery of the drum have a mutual relationship of orientation such that with each indicator setting a full view of one of the characters is afforded through the window. The outer segments of the commutator and the points of contact of the brushes therewith also have a mutual relationship of orientation such that when the indicator drum and the brushes carried by it come to rest said contact points will either be close to the center of a short segment, or well removed from the nearest gap at one arcuate end of a long segment. The long segments with one gap added each subtend an arc of approximately 65.5°, or $2/11$ of the circumference. The short segments with one gap added each subtend an arc of approximately 32.73°, or $1/11$ of the circumference. It will be apparent, therefore, that the brushes may rest in contact with any of the long segments at either of two different points, or at the center of any short segment.

The mounting of the two brushes C and D on the insulation disk 19 is such that the angular separation of their respective points of contact with outer-ring segments is substantially 98.2°, or $3/11$ of a circumference. Their points of contact with the inner ring segments A and B are diametrically opposed. Since these inner-ring segments are substantially semicircular the traverse of one brush over a given inner-ring segment is co-phasal with respect to the traverse of the other brush over the other inner-ring segment.

Fig. 3, which shows a development of the commutator rings, and the brushes, brings out the fact that the outer arm of brush C is shorter than its inner arm, and the outer arm of brush D is longer than its inner arm. This is necessitated by the angular relationships between their respective points of contact with the inner and outer ring segments and seems to be essential to the attainment of our objects. This is to say, when adopting a 6-unit safety code for dual use (1) to set an 11-position indicator and (2) for read-out purposes to derive analogue values corresponding with the indicator settings, we have yet to find any alternative angular relationships between the points of brush contact with the segments that would be useful. If such alternatives are discoverable, no advantage can be seen in their adoption. It is true that the angular separation between the points of contact of the two arms of one brush may be varied, but when this is done the relationship between the points of contact of the other brush arms must be varied inversely. Thus it is shown in Fig. 3 that angles $\alpha + \beta + 98.2° = 180°$, where $\alpha$ and $\beta$ represent respectively the arcs subtended between points of contact of the two brush arms of the one and of the other brush. When $\alpha$ and $\beta$ are varied reciprocally, a compensating re-orientation of the inner ring segments with respect to the outer ring segments must be made in order that certain gaps between segments of the outer ring may be traversed by the brushes in synchronism with the traversal of inner ring gaps.

Figs. 3, 4 and 5 are presented for the purpose of clearly showing one of several alternative arrangements of the commutator segments and brushes for carrying out fully the objects of our invention. Note that in plan views, Figs. 4 and 5, the respective patterns of the two brushes are separately outlined, but, because of a partial overlap of one brush with respect to the other, a phantom delineation of brush B appears in Fig. 5 in its proper relation to the full outline of brush C. Also in Fig. 4 the outline of brush C is omitted for the sake of clarity.

The reference numerals applied to different outer-ring segments, namely, 0, 1, 2, 4 and 7 correspond with reference numbers applied to five of the conductors in the signaling cable 15 (Fig. 8). Each conductor is connected to a segment having the same numeral. Conductor CX also connects with segment X. The signaling cables 15 and 18 are common to a plurality of indicator columns, Display, Brush D, and Brush C. Reading across the lines horizontally the numeral or blank to be displayed is set opposite the points of contact of the leading brush D and the trailing brush C on the segments. Reading downward gives the order in which the displayed digits and the segments are reached upon rotation of the indicator drum. In all cases the segments are referenced according to the designations of the code as applied to these segments respectively. Note that when the segment numbers are added together they yield the numeral to be displayed, also that when X appears in the combination the display is either "0" or "blank."

RESTING POINTS OF BRUSHES ON CODED SEGMENTS OF COMMUTATOR IN SUCCESSIVE STEPS OF DRUM ROTATION AND RESULTANT SEQUENCE OF NUMERALS ON DRUM PERIPHERY

| Display | Brushes | | Display | Brushes | | Display | Brushes | | Display | Brushes | | Display | Brushes | | Display | Brushes | |
|---|---|---|---|---|---|---|---|---|---|---|---|---|---|---|---|---|---|
| | D | C | | D | C | | D | C | | D | C | | D | C | | D | C |
| 1 | 0 | 1 | 2 | 2 | 0 | 2 | 2 | 0 | 3 | 2 | 1 | 3 | 1 | 2 |
| 8 | 7 | 1 | 7 | 7 | 0 | 7 | 7 | 0 | 8 | 7 | 1 | 9 | 7 | 2 |
| 7 | 7 | 0 | 9 | 7 | 2 | 9 | 7 | 2 | 9 | 7 | 2 | 8 | 7 | 1 |
| 2 | 2 | 0 | 3 | 2 | 2 | 3 | 1 | 2 | 2 | 0 | 2 | 1 | 0 | 1 |
| 0 | X | 7 | 0 | X | 7 | 0 | X | 7 | 0 | X | 7 | 0 | X | 7 |
| 9 | 2' | 7 | 8 | 1' | 7 | 8 | 1' | 7 | 7 | 0' | 7 | 7 | 0' | 7 |
| 6 | 4 | 2 | 5 | 4 | 1 | 5 | 4 | 1 | 4 | 4 | 0 | 4 | 4 | 0 |
| --- | 4 | X | --- | 4 | X | --- | 4 | X | --- | 4 | X | --- | 4 | X |
| 3 | 1 | 2' | 1 | 0 | 1' | 1 | 0 | 1' | 1 | 1 | 0' | 2 | 2 | 0' |
| 5 | 1 | 4 | 4 | 0 | 4 | 4 | 0 | 4 | 5 | 1 | 4 | 6 | 2 | 4 |
| 4 | 0 | 4 | 6 | 2 | 4 | 6 | 2 | 4 | 6 | 2 | 4 | 5 | 1 | 4 | units for which selective actuating means may be provided.

*Alternative patterns of the commutator segments*

The commutator design which seems to lend itself to the greatest simplicity for use in an eleven-position indicator has, as shown, four segments which span equal arcs totaling substantially 261.8° plus three segments totaling substantially 98.2°, each latter segment spanning an arc which is approximately half as great as any of the first mentioned segments. Thus, where the brushes make contact with these segments, one brush trailing the other by 98.2°, there are two resting points offered by each of the long segments and one resting point at the center of each short segment. Two of the short segments which flank the third or center one of the short segments are electrically interconnected. The center segment X when contacted by either of the brushes is simultaneous with the contacting of the other brush with segment 7 or segment 4. It is possible to interchange the positions of segments 7 and 4, but, so far as we can discover, we cannot change their arcuate relation to the segment X without defeating the objects of our invention.

When segments X and 7 are simultaneously contacted we have a setting of the indicator drum such as to display either a "blank" or the numeral "0." Whichever one of these two displays is chosen, the other must be obtained by the simultaneous contacting of the two brushes with segments X and 4. The positions of the other segments, according to their significance in the additive code we use, may be interchanged permutatively without disabling our system, as will now be shown.

While observing the limitations set forth in the two preceding paragraphs we find that there are twelve possible patterns of segment sequences and sequences of the digits to be displayed around the periphery drum, any pattern being as acceptable as any other for all practical purposes. Six of these patterns of one group are respectively similar to the remaining six patterns of a second group except that their segments 4 and 7 are interchanged as between the two groups. One of the patterns of the first group is shown in Fig. 7, while the five alternative patterns of the same group are shown in the following tables. Each table comprises three vertical In the above tables, as well as in Figs. 3 and 7, the short segments which flank segment X are designated 2 and 2', 1 and 1', and 0 and 0' respectively to indicate that they have one and the same code element connection, although they are separated by the segment X.

The purpose of this chapter on alternative patterns of the commutator segments is to show that for carrying out our invention there is a limitation which is imposed on the range of alternative patterns of the segment sequences and corresponding sequences of the numerals as disposed around the drum. This limitation is due to the fact that the brushes have two resting points on the long segments and effectively two resting points on the combined short segments which are electrically interconnected, but only one resting point on the segment X. Therefore it is within the scope of our invention to adopt any one of the available patterns as a matter of inconsequential choice.

*The control circuit for indicator setting operations*

The control circuit shown in Fig. 8 is illustrative of a system which is capable of expansion so as to enable any desired number of indicators to be selectively operated and to be individually set for desired indications. For simplicity of the disclosure only two horizontal rows of indicator units are shown. Indicators for two digital denominations, units and tens, are shown in each row. Obviously if there is a need for displaying numbers of more than two digits in each row, or for displaying more than one statistical item in each row the components of the system can be duplicated indefinitely.

The key-strip 16 serves to control an indicator 21 or 23 of units denomination in any selected horizontal row. Key-strip 17 serves a like purpose in connection with indicators 22 and 24 of the tens denomination. Key-strips 16 and 17 are of similar structure, so that the key contacts appearing in key-strip 17 and their connections to the signaling cable 18 will be understood to be duplicated in the key-strip 16 and the connections of their key contacts to the signaling cable 15.

For setting an indicator selectively in any one of eleven positions our safety code must comprise six signaling units different pairs of which are chosen for making each positional selection. The selecting signals are, therefore, permutationally paired for transmission over the conductors C0, C1, C2, C4, C7, and CX in cable 15. This holds true also for the conductors in cable 18.

A correspondence will be seen between the key-set numerals and the sum of the reference numerals of the pair of conductors in cable 15 or cable 18 which are interconnected by any closure of contacts of a given key. This arrangement provides a new result when it comes to the derivation of analogue values corresponding to the indicator displays, except when the indicator is set to display a blank. If we were to use a 10-position indicator drum it can be shown that a 5-unit safety code might be used, the conductors of its selecting cable being the same as and similarly permuted with respect to the conductors of cables 15 and 18 except that conductor CX would be omitted, and also the contacts of the "0"-key would be connected to conductors C4 and C7. This modification will be hereinafter explained in more detail, but right here we revert to a further explanation of the utility of our six-unit code.

The code elements are designated 1, 2, 4, 7 and X respectively in order that the values of their designations may be used additively in pairs to represent different digits to be displayed by an indicator, and "0" or "blank" positions of an indicator when code element X is one of the pair. This code has an advantageous feature in that it can be given out as a sampling signal to remotely indicate the setting of any indicator. The signal so given out also has an analogue value corresponding with the numeral displayed by the indicator. The utilization of analogue values in this connection will be explained in an ensuing chapter. Other details of Fig. 8 should, however, be first explained.

Conductors 34 and 35 are shown in the circuit diagram to enter each indicator unit on the left side thereof. These conductors include two of the terminals 13 of the printed circuit and they lead to the semicircular inner-ring segments A and B of the commutator. Upon operation of a row-selecting relay 25 or 26 a potential is caused to be fed from battery 32 to all the inner-ring segments of indicator units in the selected row. This is accomplished by manipulation of switches 27 and 29 thus:

Rotary switch 27 is shown as a typical means for making a row selection. Other well known means may be used if preferred for selectively energizing any one of the relays 25, 26 and the like. A lever switch 29 or its equivalent is moved into the position labeled "Register," whereat its movable contact makes with contacts $a$ and $b$. Assuming that switch 27 was set to the position shown, then relay 25 will operate for the selection of indicator units 21 and 22. Slow-acting relay 30 will also be operated, this relay having circuit-closing contacts which feed current from source 28 to an interrupter or pulsing device 31 and thence to stepping magnets SM in the selected row of indicators.

The step-by-step rotation of indicators of the selected row will continue, driven by the stepping magnets SM until each indicator unit reaches the setting which corresponds with key selections made at the key-strips 16 and 17. Depression of any key causes a certain pair of conductors in cable 15 or cable 18 to be interconnected. This completes a circuit through the commutator of a selected indicator unit only when agreement is reached between the key selection and the setting of the indicator. That is when the two brushes C and D rest simultaneously on segments that are interconnected by the keyed circuit closure. Fig. 7 shows that each setting or display position of the indicator is obtained by resting the brushes C and D on an appropriate combination of segments which relates exclusively to that setting. If the indicator position and the key selection were to be in agreement before operation of the register switch 29, then stepping operations would be prevented by operation of one of the relays 33 before the first pulse can reach the stepping magnet SM. This, then, is the purpose of the slow-acting relay 30, the contacts of which feed current through the interrupter 31 to the stepping magnets. The pulsing current does not start before the operation of the selecting relay 25 or 26. In any case, relay 33 operates as soon after operation of the key 29 as the indicator unit and the numerical key selector come into agreement. Thus the circuit of the stepping magnet SM is opened by complete closure of the signaling circuit through the commutator.

It will be apparent to those skilled in the art that electronic switching means may be substituted for the relays 33. In Fig. 8 it is apparent that, aside from negligible contact resistances in the signaling circuits through the key-set, the commutator and brush arrangement of an operating indicator and the contacts of relay 25 or 26, there is only the winding resistance of relay 33 to be relied upon for current limitation in these signaling circuits. The current required to operate relay 33 may be quite small, but it can, nevertheless be reduced still further if a pure resistance were to be used in place of the winding in relay 33. Such a resistance would serve, if desired, as a grid biasing circuit for a space discharge tube. Such a tube is not shown in the drawing for the reason that, as a mere switching means, it is often regarded as the equivalent of a magnetic relay, and the substitution of one type of switch for another without materially modifying its function would not seem to be inventive. It is clear, however, that the stepping magnet SM may be conventionally placed in series with the space path of a thyratron or other discharge tube and this tube, in turn, may have its starter anode controlled by the voltage drop in a bias resistor substituted for the winding of relay 33. The interrupter 31 enables the thyratron to be extinguished after each step of the stepping magnet. Further steps are prevented when current flows in the bias resistor, due to a voltage drop therein which would carry the voltage of the starter anode below what is needed to cause triggering. Other electronic techniques may also be adopted if desired, in order to control the stepping magnet SM in a manner to produce the same results as are obtained with the circuit-opening relay 33.

Indicator units may be operated simultaneously in any selected row. The required number of steps to be taken by each indicator unit will depend, of course, upon the location of the numeral to be displayed in relation to the location of the previously displayed numeral, circumferentially of the drum. Setting steps will, therefore, continue for some indicator units of a selected row after the proper setting has been reached by other units. When all units have reached the desired settings the registering key 29 will be restored to normal so as to release relay 30 and the selected one of relays 25, 26 and the like. The pulsing device 31 may be of the type which comprises a continuously rotated commutator operable to deliver pulses at a cadence which can be followed by the ratchet-and-pawl mechanism when driven by the stepping magnet SM. Other types of pulsing devices or interrupters may, however, be used if desired. They are well known in the art.

*The analogue computer*

The circuit diagram of Fig. 8 is extended over to Fig. 9, where means are shown for integrating several different values according to a read-out of such values from selected indicator units. The code conductors in signal cables 15 and 18, with the exception of conductor CX in cable 15 and the corresponding X-conductor in cable 18, are branched to certain relays 36 to 43 inclusive which operate to control a voltage divider or potentiometer 44. Return circuits for these relays are closed by operation of make contacts of a relay 47, this relay having a sampling function when lever 29 is moved to the position labeled "Sample" so as to feed current through make contact $d$ and thence to the winding of relay 47. Under control of relay 47 five of the signaling conductors are looped back on themselves. These are conductors C0, C1, C2, C4 and C7, pertaining to indicators of the units denomination. Conductor C0 is joined to the others through resistor 45 which preferably has a value substantially equal to that of any one of the windings in relays 36 to 39 inclusive. Likewise the 0-signal conductor in cable 18 appropriate to the tens-denomination is joined to the return circuits for relays 40 to 43 inclusive, resistor 46 being placed in this joining circuit for holding the sampling signals at a constant level.

Equipment is shown in Fig. 9 which would be sufficient for integrating analogue values corresponding to the values of units and tens denominations as digitally displayed by any two selected indicators. The weighted value of each tens digit would in this case be ten times as great as that of the corresponding units digit. The voltage divider system 44 provides the means for integration of these values. It is made operable under control of a signal directed through one or two of the windings of relays 36 to 39 inclusive, and another signal directed through one or two of the windings of relays 40 to 43 inclusive. The selection of relays to be operated is in accordance with the commutator segments which are contacted by the two brushes of a selected indicator at the time of transmission of a sampling signal.

A sampling signal is originated by throwing the lever switch 29 to the position which causes battery potential from source 28 to be fed through contacts $c$ and $d$, whereby a row selecting relay such as 25 or 26, and also relay 47 may be operated. Relay 25, for example, causes battery potential from source 32 to be impressed as a positive voltage on one of the brushes of a selected indicator to which conductor 35 is connected. The negative or grounded side of the battery is also connected to the other brush through conductor 34. These connections are completed through closure of the multiple contacts of relay 25 and provide a closure of sampling circuits for simultaneous read-out of all the indicator settings in a selected row.

Considering an indicator 21 of the units denomination, for example, if either of its brushes rests on the 0-segment, then it will pass either $a+$ or $a-$ potential through resistor 45 to the interconnected contacts of relay 47 which are in circuit with relays 36 to 39 inclusive. Then only one of these relays will be operated, depending upon which segment of the commutator is contacted by the other of the two brushes. The two brushes are always oppositely poled, due to the fact that their contacts with the semi-circular segments of the inner ring are diametrically opposed and the latter are oppositely poled upon operation of relay 25.

When the indicator displays one of the digits 1 to 9 inclusive, that digit is equivalent to the sum of two values of the code signal elements used to obtain that same digit display. In the sampling operation the same code signal conductors are energized as when selected by key operation for registering a new display by the indicator. When sampling, all keys of the key-strips 16 to 17 must be restored to normal so that no feed-back of energy will drain off through non-selected ones of the relays 36 to 43 inclusive. The relay selecting circuit chosen by the existing position of the indicator, that is, by the resting points of its brushes on a certain pair of outer-ring segments will always be traceable in one of the two following ways, or else it will not be completed due to the setting of the indicator drum to display a "blank": (a) one of the relays 36 to 39 will be operated singly and the return circuit will be through resistor 45; or (b) the sampling circuit will be completed by placing the windings of a selected pair of the relays 36 to 39 in series. In either case the voltage divider 44 is automatically adjusted to reflect an analogue value equivalent to the indicator registrations.

*Derivation of analogue values from the voltage divider*

The voltage divider circuit 44 has a plurality of series-connected resistive components $r_1, r_2, r_4, r_7, r_{10}, r_{20}, r_{40}, r_{70}, s_1, s_2, s_4, s_7, s_{10}, s_{20}, s_{40}, s_{70}$, the resistive values of which are carefully chosen to be in the same ratio one to another as is indicated by their subscripts. Each of the resistors $r$ can be selectively short-circuited through make contacts of one of the relays 36—43. The resistors $s$ are each of a value corresponding to a resistor $r$ having the same subscript. These resistors $s$ are normally short-circuited but can be introduced into the circuit of the voltage divider in place of a corresponding resistor $r$ of the same value. The function of each of the relays 36—43 when they operate is to transfer a certain resistance from the left leg of the voltage divider to the right leg. Any such transfer leaves the overall resistance of the circuit unchanged, but it changes the value of the voltage to be derived in the output circuit 50.

The source 48 supplies a suitable potential for producing a utilizable voltage drop across the voltage divider circuit 44. One side (the negative pole as shown) of the battery 48 is normally open-circuited, but can be grounded by operation of the relay 47 which has make contacts for this purpose. This relay 47 operates, as stated above, upon setting the switch 29 for a sampling, or read-out of indicator displays.

*Operation of the analogue computer*

In order to present an example of how a plurality of analogue values may be derived, integrated, and co-ordinated for a useful purpose let it be assumed that the number 57 is registered on indicators 21 and 22, the units digit being shown on indicator 21 and the tens digit on indicator 22. Assume, also, that in the same row of indicators with indicators 21 and 22 there are two other indicators on which the number 43 is registered in the same manner. To select these four indicators for the read-out the number of contacts of the gang relay 25 will need to be doubled, this being quite understandable without unduly complicating the drawing with such details.

The read-out of digital values from the assumed indicators which together display the number 43 will now be translated into an integrated analogue equivalent which is reflected in an adjustment of a voltage divider 49 (Fig. 9). This voltage divider is shown as a diagrammatic block because of its being an exact replica of the voltage divider 44.

It may be considered useful, for example, to display the analogue value 43 as an $x$-co-ordinate and the value 57 as a $y$-co-ordinate of a graphic plot. The display can be made, for example on the screen of an oscilloscope 51 in which are beam deflecting plates 52 to produce vertical deflection and plates 53 for horizontal deflection. The output circuit 50 from voltage divider 44 is connected to one of the vertical deflecting plates 52 and causes the analogue value of the $y$-component to correspond with the number 57. Likewise the output circuit 54 from the voltage divider 49, being connected to one of the horizontal deflecting plates 53 controls the beam deflection horizontally so as to reflect the analogue value 43 as the $x$-component which is the assumed setting displayed by the two indicators not shown. The translations of digital values into analogue values for the two numbers 57 and 43 are, of course, separate and independent of each other, their circuits being individual to each indicator unit. The results are obtained by integrating the analogue values of resistors $s$ which are substituted for resistors $r$ of corresponding ohmic value. In the example given, the potential drop through resistors $s_{40}$ and $s_{10}$ represents the tens digit 5 as displayed on indicator 22, said resistors $s$ being substituted for corresponding resistors $r$ when relays 42 and 40 are operated. Their operation is due to the fact that when indicator 22 displays the numeral 5 it brushes C and D rest on segments 4 and 1 respectively, thus completing a series circuit which may be traced from ground through certain closed contacts of relay 25, the winding of relay 33 (operation of which is inconsequential at this time), brush C, segment 4, signal code conductor leading to relay 42, the winding of this relay, thence through certain closed contacts of relay 47, the winding of relay 40, returning through the code signal conductor which connects with segment 1 on which brush D rests, and thence through certain closed contacts of relay 25 to the + terminal of the battery 32. The analogue value equivalent of the tens digit 5 is thus set up on the voltage divider 44. To that value is added the value of the single resistor $s_7$ which is introduced as a substitute for resistor $r_7$ by operation of relay 39. In this case, where the units-digit indicator 21 is set to display the numeral 7, its brushes C and D rest on segments 0 and 7 respectively. Hence the return circuit from relay 39 must at this time (but not always) be traced through closed contacts of relay 47, resistor 45 and signal conductor C0 which connects to segment 0 in indicator unit 21. The total of resistive values which are integrated by the introduction of resistor $s_{40}$, $s_{10}$ and $s_7$ into the right hand leg of the voltage divider 44, while corresponding resistors $r$ are shorted out from the left hand leg causes the potential in the output circuit 50 to assume the proper value to represent the number 57 as displayed jointly by indicators 22 and 21.

Considering the voltage divider 49 for translation of digital values of the separate denominational orders of indicators which display the number 43, these indicators not being shown in the drawing, it may be readily understood that circuit arrangements similar to those already described in reference to the voltage divider 44 would be used as as indicator read-out means and would control the unit 49 for the derivation of an analogue value of voltage in the output circuit 54 corresponding to the number 43. This voltage is readable on the oscilloscope as the $x$-co-ordinate of the graphic plot. It is, therefore, feasible in carrying out our invention to co-ordinate the analogue values of two independent variables and to indicate the results in terms of $x$ and $y$ co-ordinates of a graphic plot.

In the diagram which shows the oscilloscope 51 no attempt has been made to include details that are conventional and well known in the construction of oscilloscope apparatus. Such details would ordinarily include means for initially aiming the electron beam into the lower left hand corner of the screen where the spot would stand at the common origin of the $x$ and $y$ co-ordinates in the presence of ground potentials delivered by the two output circuits 50 and 54.

*Adaptation of the invention for the use of 10-position drums*

Without departing from the basic principles which underlie our invention it is possible to utilize indicator drums which are settable to any one of only ten positions. One additive safety code may be used which has only five elements, conveniently designated 0, 1, 2, 4 and 7 respectively, since these are the weighted values which each element possesses for translation into control signals either for the setting of the drum to display a desired digit, or for read-out purposes when analogue values are wanted.

Another additive safety code useful for setting the drum and equally so for read-out purposes is that in which the five elements are designated 0, 1, 2, 3 and 6 respectively.

With either one of these five-element codes there are only ten ways in which two code elements can be paired. By nine of these permutational pairings the nine digits are directly derived.

Using the code elements 0–1–2–4–7 we are also able to reserve the pair 4–7 to represent "0" and to set the drum to display "0." Using the code elements 0–1–2–3–6 we pair them permutatively in like manner to derive the nine digits, but we have to choose between the pair 0–3 and the pair 1–2 as a representation of the digit "3." The pair 0–3 is preferable for reasons to be explained hereinafter in connection with the read-out for analogue value derivations.

The commutator ring for a 10-position indicator drum has only five segments, each spanning ⅕ of the circumference. The brushes are mounted on and rotate with the indicator drum, one brush trailing the other over these segments with a phase difference of, preferably 108°. The brushes must, however make contact with the semicircular inner-ring segments, or slip ring, at diametrically opposed points, the same as indicated in Figs. 3 and 5.

The order, or sequence of digits to be displayed successively around the 10-position drum periphery with successive steps of rotation can be widely varied, depending always, of course, on how the signaling conductors are assigned to the five segments of the commutator ring. One usable pattern of the digital sequence appears to have no advantage over others that are usable. Many patterns are not usuable because each brush has two resting positions on each segment and each position must have a different selective effect from the others, considering the resting points of the two brushes at any one instant.

The digital sequence around the drum periphery must, therefore, be in conformity with the assignment of the five code elements of the additive signal code to the respective segments in the commutator ring. There is no such assignment as would enable the numerals to be arrayed in their natural order. Two of the many workable arrangements, however, are shown in the two following tables, that on the left side using the code 0–1–2–4–7 and that on the right side using the code 0–1–2–3–6. The sequence of displayable numerals may be read either upwardly or downwardly in the first column of each table. With each digit display the required resting points of the two brushes are shown in the second and third columns, naming the commutator segments according to the code elements respectively assigned thereto:

| Display | Segments Contacted by— | | Display | Segments Contacted by— | |
|---|---|---|---|---|---|
| | Brush C | Brush D | | Brush C | Brush D |
| 1 | 0 | 1 | 1 | 0 | 1 |
| 7 | 0 | 7 | 6 | 0 | 6 |
| 8 | 1 | 7 | 7 | 1 | 6 |
| 3 | 1 | 2 | 0 | 1 | 2 |
| 9 | 7 | 2 | 8 | 6 | 2 |
| 0 | 7 | 4 | 9 | 6 | 3 |
| 6 | 2 | 4 | 5 | 2 | 3 |
| 2 | 2 | 0 | 2 | 2 | 0 |
| 4 | 4 | 0 | 3 | 3 | 0 |
| 5 | 4 | 1 | 4 | 3 | 1 |

It will be observed in the above tables that the value of the displayed digit is equal to the sum of the code numbers by which the segments are identified. Also, the two resting points of any brush in successive steps of rotation are clearly evidenced, as well as the fact that the sequence of the code numbers must be the same in the columns showing Segments Contacted.

*The read-out of digital displays from a 10-position drum*

It can be seen from the foregoing description of the 10-position indicator drum and the possibility of setting it by different permutations of a 5-element code that each but one of the different permutations of these code elements, taking them two at a time, is useful for controlling the operation of an analogue value translator like that shown in Fig. 9. The exception is where in the code 0–1–2–4–7 the pair of code elements 4 and 7 is used to represent "0," and in the code 0–1–2–3–6 the pair of code elements 1 and 2 is used to represent "0." To obtain a read-out of the "0" display on any indicator drum we are obliged to cancel the effect of adding 4+7=11, as with one code, or 1+2=3, as with the other code. Using either code the analogue value translation must, of course, be "0." This we accomplish in a manner shown in Fig. 10, which, however, should be considered only with respect to the code 0–1–2–4–7.

That part of the voltage divider 44 (or 49) which requires modification in order to obtain the cancellation mentioned in the preceding paragraph is indicated in Fig. 10 as a fragmentary circuit arrangement. Instead of only four relays such as relays 36—39 for the units digit and four other relays for each of the other digital orders, five relays are required. The fifth relay 55 for the units denomination and like relays for other denominations is operable only when the two relays 38 and 39 happen to be simultaneously operated.

Each of the relays 38 and 39 has contacts to be closed in series when they both operate. The series closure causes an operating circuit to be closed through the winding of relay 55 having transfer contacts $a$ on the left side (as shown) and make contacts $b$ on the right side. The movable contact of group $a$ on relay 55 maintains a normal connection between resistors $r_4$ and $r_2$ when relay 55 is not operated. The function of relay 55 is carried out when the code element pair 4+7 is to be given an analogue value equal to "0." It is necessary to restore the amount of resistance in the left hand leg of the voltage divider that was shorted out by the operation of relays 38 and 39, resistors $r_4$ and $r_7$ being so shorted. Furthermore, the introduction of resistors $s_4$ and $s_7$ into the right hand leg of the voltage divider must be nullified. So relay 55 performs its dual function on read-out of the "0" indicator display as follows:

Resistor $r_{11}$ has the same value as the sum of the two resistors $r_4$ and $r_7$. Resistor $r_{11}$ is connected between the upper terminal of resistor $r_7$ and the front contact of group $a$ on relay 55. The bridging contacts across resistors $r_4$ and $r_7$ lead to the back contact of group $a$ and their short-circuiting effect is now nullified. Resistor $r_{11}$ effectively restores the resistance value that was erroneously shorted out. As for resistors $s_4$ and $s_7$ which are caused to be introduced by relays 38 and 39 on obtaining a "0" read-out, relay 55 at this time closes its contacts $b$ and thus restores the short circuit across these resistors, as needed.

Fig. 10 may also be used to illustrate the "0"-correction when the code 0–1–2–3–6 is applied. In this case relay 55 would be energized by simultaneous closure of supplemental contacts on relays 36 and 37, and the supplemental resistor referenced $r_{11}$ as shown in Fig. 10 should for consistency be referenced $r_3$ to represent its value equivalent of $r_1+r_2$. Furthermore contact $b$ of relay 55 would short-circuit $s_1$ and $s_2$.

The above described mode of operation of the relay 55 and its use to obtain an analogue value equivalent of "0" when the read-out is "0" in the units denomination has the same application to the read-out of "0" in other denominations. Therefore, if the voltage divider 44 were to be completely re-drawn to take the place of the fragmentary circuit of Fig. 10, it will be understood that the equivalent of relay 55 and its circuit connections would need to be operatively associated also with relays 42 and 43 where the latter have to do with analogue values in the tens-denomination.

Summary

The foregoing description and the accompanying drawings are believed to cover explicitly the nature of our invention and what we believe to be the most advantageous ways of carrying it out. We have shown sufficient modifications to suggest others which would come within the scope of the invention and could readily be assembled by those skilled in the art by observance of our teachings. We do not wish, therefore, to be limited to the precise constructions used in our exemplary embodiments, but the scope of the invention itself is to be interpreted broadly according to what is defined by the claims.

We claim:

1. Apparatus operatively associated with a settable indicator drum for input and output signaling purposes, where input signals are used to selectively determine the setting of the drum and output signals are used to remotely indicate a current display position of the drum, said apparatus comprising a commutator-and-brush assembly, there being a plurality of selector segments of the commutator in the path of the brushes and the brushes being arranged to traverse said path in fixed mutual phase relations, one to another, also in fixed phase relation to the selective display positions of the drum, a segmented collector ring also traversed by said brushes and so disposed that each brush makes exclusive contact with one only of the collector ring segments, each of said selector segments having a fixed code significance designation such that when an invariable number of code elements is permutatively chosen from a fixed greater number of such elements of the utilized signals, and the chosen code elements are applied as electric signals through correspondingly designated segments and the same segments are at that time contacted by said brushes, said apparatus is then conditioned either to sense a correspondence between the display position of the drum and the particular code element combination by which that display position is selected, or else to transmit a signal having utility for remotely manifesting said current display position.

2. Apparatus according to claim 1 in combination with a multiple conductor read-out signal channel and a remote translator operable through certain conductors of said channel which are in circuit with commutator segments currently rested upon by said brushes, whereby the display position of the drum is remotely manifested.

3. Apparatus according to claim 1 in combination with a step-by-step driving mechanism to rotate the drum, a pulsing circuit to motivate said mechanism, a starting device for activating said driving mechanism and pulsing circuit, and means under control of said apparatus for de-activating said driving mechanism at the instant of sensing a correspondence between the display position of said drum and the particular signal code-element combination by which that display position is selected.

4. Apparatus responsive to code signals for selectively setting a drum dial indicator directly from an old to a new display position, the number of alternative display positions being greater than the number of code elements in the adopted code, comprising a step-by-step driving mechanism to rotate the drum, a pulsing circuit to motivate said mechanism, a sensing device having a segmented commutator with brushes wiping over it for responding to an applied code signal, the brushes of said device being rotatable with the drum and the segments of the commutator being individually identified with and corresponding to the code elements, and circuit opening means for de-activating said driving mechanism after driving the brush elements into simultaneous contact with two segments which are chosen to sense a particular combination of code elements.

5. Apparatus according to claim 4 and further characterized in that the number of said alternative display positions is eleven and the number of code elements in the adopted code is six.

6. Apparatus according to claim 4 and further characterized in that the number of said alternative display positions is ten and the number of code elements in the adopted code is five.

7. Apparatus operatively associated with a settable digit indicator drum for input and read-out signaling purposes, where an input signal is used to selectively determine the setting of the drum and a read-out signal is used to remotely indicate a current setting of the drum, including means for composing a read-out signal which is translatable into an analogue value and which determines that value in equality with a digital value currently displayed by the settable indicator drum, said apparatus comprising a 5-conductor signaling channel terminating in a selectively operable responsive device which is capable of conversion of a signal potential into an analogue value summation, a segmented commutator with brushes wiping over it for determining the composition of said read-out signal as a selection of two of the five conductors in the signaling channel to carry said signal potential, said brushes being rotatable with said drum and their respective resting points on different segments being determinative of said signal composition.

8. Apparatus according to claim 7 wherein said responsive device includes a voltage divider circuit having two series-connected chains of resistive links, a potential source connected across the extremities of said circuit, an output circuit connected in shunt with one only of said chains, relay switching means variably operable by said read-out signal for effectively transferring the resistance value of one or more links out of one chain and into the other chain, thereby to vary the potential at the junction between said voltage divider circuit and said output circuit in correspondence with a summation of two nominal values that are assigned respectively to the signaling purport of the selected conductors, each of the five conductors having a predetermined value assignment such that when they are permutatively paired for the composition of a read-out signal an appropriate summation of values is derived corresponding to any one of the digital values displayable by the indicator drum.

9. In a device operatively associated with an eleven-position indicator drum, a segmented commutator face plate constructed as a printed circuit, the face plate having a complement of selecting segments in one ring and a complement of semicircular segments in another ring, a pair of brushes carried by and rotatable with said drum and arranged to sweep over said face plate with one brush trailing the other in contact with the selecting segments at a phase angle of approximately 98°, and having diametrically opposed contacts with said semi-circular segments, electro-mechanical stepping mechanism operable to rotate the drum, a setting control circuit arrangement having a multi-conductor signaling channel the conductors of which are individually connected to different ones of said selector segments, a signal potential source connected to said circuit through said semicircular segments and said brushes and thence to selecting segments on which the brushes may rest, and means under control of said circuit arrangement for terminating the operation of said setting mechanism in response to the establishment of a closed circuit from said potential source through said brushes and through selected ones of the conductors in said signaling channel.

10. In a device for setting an 11-position indicator drum, a 7-segment commutator ring having its segments directly connected through six conductors to a selective signaling device, one of said conductors being connected to two of the segments, a pair of brushes carried by and rotatable with said drum and arranged to sweep over said commutator with one brush trailing the other by approximately 98°, slip-ring connections individual to said brushes for applying an operating potential across the same, electro-mechanical stepping mechanism operable to rotate the drum from an old setting directly to a selected new setting, and means responsive to cooperative action by selective adjustment of said signaling device and by the sweep of said brushes into contact with two selected segments of the commutator ring whereby said stepping mechanism's operation is caused to be arrested, said selective adjustment of the signaling device being one wherein two of said conductors are permutatively chosen to be interconnected in accordance with a signal code combination appropriate to the desired new setting of the drum.

11. The combination according to claim 10 and including means for utilizing the resting points of said brushes on two particular commutator segments to indicate remotely the standing display position of the drum.

12. In combination, a 7-segment commutator ring wherein each of four segments spans an arc of substantially $2/11$ of the circumference, and each of the three three remaining segments spans an arc of substantially $1/11$ of the circumference, a pair of brushes arranged to sweep over said ring with one brush trailing the other by approximately 98°, slip-ring connections individual to said brushes, a potential source connected across said slip-ring connections, and a selective circuit having multiple conductor connections to said segments, the combination so defined constituting means for exercising control over an 11-position rotatable indicator drum to set the same to any one of its eleven display positions.

13. In combination, a 7-segment commutator ring wherein each of four segments spans an arc of substantially $2/11$ of the circumference, and each of the three remaining segments spans an arc of substantially $1/11$ of the circumference, a pair of brushes arranged to sweep over said ring with one brush trailing the other by approximately 98°, slip-ring connections individual to said brushes, a potential source connected across said slip-ring connections, and a responsive device connected through parallel conductors to said segments, said combination being operable to obtain a readout which reflects remotely an analogue value corresponding to the numerical value of a digit displayed by an indicator drum to which said brushes are attached.

14. A commutator-and-brush arrangement for stepwise control of the setting mechanism in an 11-position indicator wherein the arc spanned by each of four segments is equal to $2/11$ of the circumference, and the arc spanned by each of three adjacent segments is equal to $1/11$ of the circumference, selective control means comprising a 6-conductor channel the individual conductors of which constitute means for transmitting code signals to said segments, one of said conductors and two of the shorter segments being interconnected, the remaining five conductors and the remaining five segments having separate and individual interconnections, said brush arrangement having two brushes one of which trails the other in sweeping over the commutator with a phase difference of approximately 98°, and slip-ring connections individual to said brushes for applying an operating potential thereacross.

15. The combination according to claim 14 and including in said selective control means a keying device for permutatively interconnecting different pairs of said conductors to signify a desired one of the eleven alternative indicator display positions whereat the operation of said setting mechanism is to be arrested.

16. Selective control apparatus for setting an indicator unit of the revolving drum type, comprising stepwise operable setting mechanism, a pair of brushes mounted on and rotatable with the drum element of said indicator unit, a segmented face-plate to be wiped by said brushes, one trailing the other with a phase difference not greater than 108°, slip-ring connections individual to said brushes, an operating potential source applied across said slip-ring connections, a pulsing circuit operable to deliver one or more stepping pulses to the magnet of said setting mechanism, and selecting means including a keying device to interconnect a chosen pair of conductors in a multi-conductor signaling channel, said means being operable by the establishment of a closed circuit through said chosen pair of conductors when the segments with which they are connected are respectively contacted by said brushes, and said selecting means including also a relay the winding of which is in circuit with one of said slip-ring connections, and break contacts of said relay disposed in said pulsing circuit, whereby the operation of said means results in the arrest of operation of said setting mechanism upon obtaining a desired setting of the indicator unit.

17. The combination according to claim 16, wherein said segmented face plate has a ring of five equal arc segments and said setting mechanism is arranged and adapted to set the drum of the indicator unit at rest in any one of only ten positions.

No references listed.